Aug. 26, 1952 W. TURNER ET AL 2,607,944
COMBINATION WINDSHIELD WIPER
Filed Aug. 15, 1947 2 SHEETS—SHEET 1
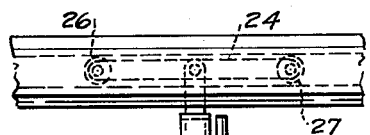
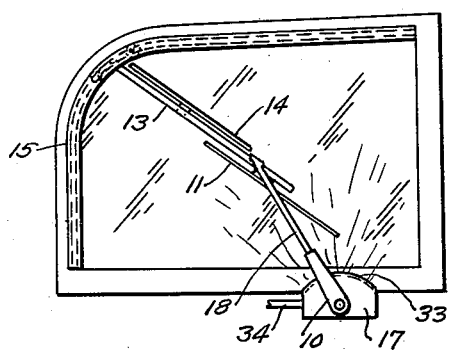
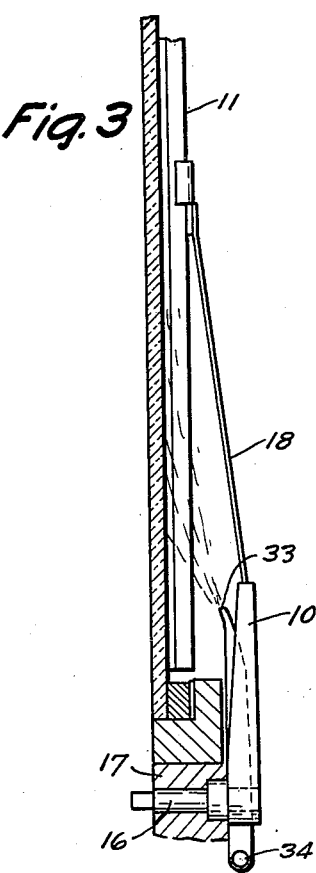
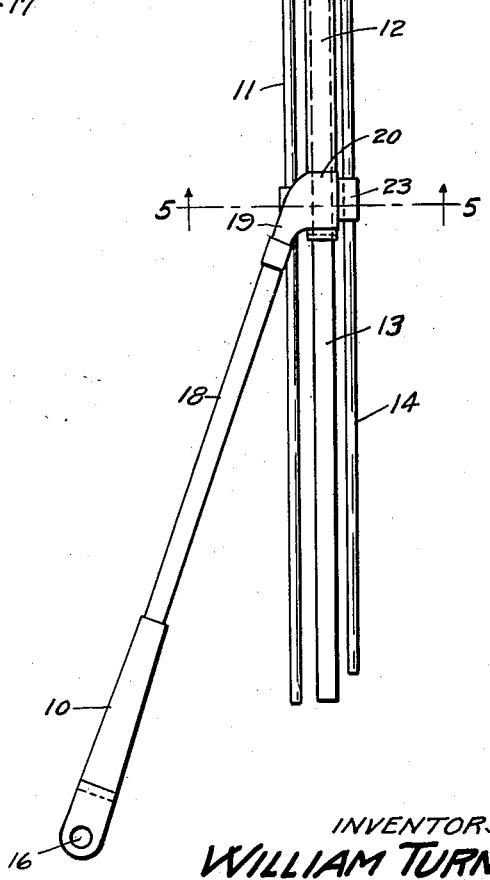
INVENTORS
WILLIAM TURNER
DAN SHAW
James Harrison Bowen
THEIR ATTORNEY

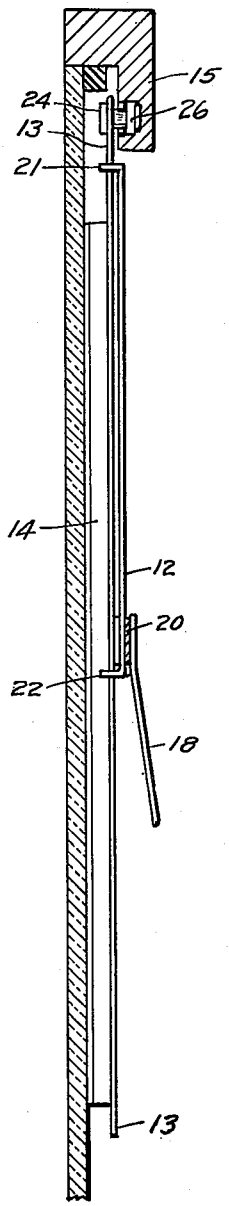
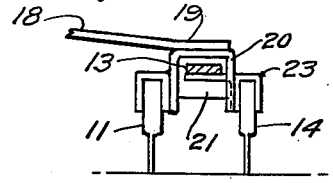
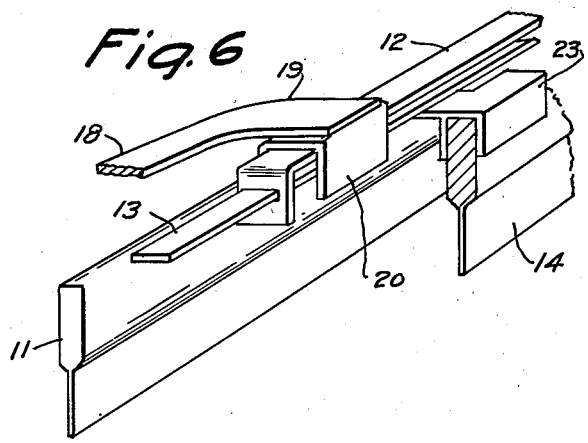
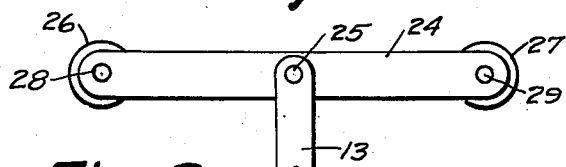
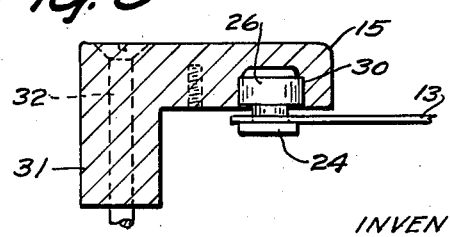
INVENTORS
WILLIAM TURNER
DAN SHAW
THEIR ATTORNEY Patented Aug. 26, 1952

2,607,944

UNITED STATES PATENT OFFICE 2,607,944

COMBINATION WINDSHIELD WIPER

William Turner and Dan Shaw, New York, N. Y.

Application August 15, 1947, Serial No. 768,850

4 Claims. (Cl. 15—255)

This invention relates to wipers for windshields and the like wherein it is desired to clean the entire surface of the windshield and in particular includes a pivotally mounted reciprocating wiper arm with a wiper of the usual type mounted in operative position on the outer end thereof, and a second wiper also of the usual type on the outer end of a telescoping rod pivotally mounted on the outer end of the arm, wherein the outer end of the second wiper is provided with rollers adapted to travel around the edge of the windshield.

This invention is an improvement over the windshield wiper of our copending application filed November 15, 1946, with the Serial Number 710,731, in that a wiper is provided at the end of the stiff arm and the outer telescoping arm is pivotally attached to the stiff arm and provided with rollers at the outer end to facilitate expanding and contracting thereof.

The purpose of this invention is to provide an improvement over the usual windshield wiper by combining therewith a second wiper and mounting the second wiper so that it will travel outward and inward to cover substantially the entire windshield.

In the usual type of windshield cleaner the wiper travels back and forth in an arc leaving an uncleaned portion above the arcuate line described by the upper end of the wiper and in a heavy rain or snow this is very objectionable. With this thought in mind this invention contemplates a combination of wipers and means whereby the wipers will operate to clean the entire windshield.

Various devices have been provided for cleaning the entire surface of a windshield but these are generally bulky and where a track is used around the peripheral edge of the windshield it has been found that the track becomes filled with ice and snow and the wiper fails to operate. For this reason the wiper of this invention includes a resiliently held arm for supporting the outer wiper and guide rollers at the end of the arm that roll over ice or other obstructions that may accumulate on the windshield.

To be practical for universal use a device adapted to be mounted on a motor vehicle windshield must be of comparatively light weight and at the same time of sufficient ruggedness to withstand the elements. With this thought in mind this invention uses a relative thin supporting arm with the parts of channel shape so that they obstruct as little vision as possible and at the same time have sufficient durability to withstand the shocks and strains to which such devices are subjected.

Another important consideration in the construction of windshield wipers is the fact that the wiper must be adapted to adjust itself to windshields of different sizes, and to accomplish this end the wiper of this invention is formed with a telescoping arm that has plenty of travel in either direction so that it will cover windshields within reasonable limits.

A further consideration in devices for use on motor vehicles such as windshield wipers and particularly devices including mechanically actuating instrumentalities, is that the device must be capable of being removed and replaced or repaired by the unskilled mechanic particularly at filling stations, and for this reason this device is formed of substantially interchangeable parts and held together by simple attaching means.

The object of this invention is, therefore, to provide a windshield wiper arm having a telescoping extension wherein with one wiper carried by the arm and another carried by the extension substantially the entire surface of a windshield may be cleaned.

Another object of the invention is to provide a windshield wiper having a plurality of wiping elements on a common arm wherein the elements are actuated by the arm to clean the entire surface of the windshield.

A further object of the invention is to provide a windshield wiper having one wiper element on an arm and another on an extensible arm mounted on and actuated with the former arm which is of a simple and economical construction.

With these and other objects in view the invention embodies an arm pivotally mounted adjacent one side and intermediate of the ends of a windshield, one wiper carried by the arm, a bar also carried by the arm, a rod slidable in the bar, another wiper carried by the rod, a track around the edge of the windshield, and guide rollers on the rod positioned in the track.

Other features and advantages of the invention will appear from the following description taken in connection with the drawings, wherein:

Figure 1 is a view illustrating a typical windshield showing the wipers mounted in combination therewith.

Figure 2 is a plan view of the wiper assembly.

Figure 3 is a side elevation showing the wiper assembly with the telescoping rod omitted.

Figure 4 is a side elevation of the wiper assembly showing in particular the outer wiper and telescoping rod with parts broken away.

Figure 5 is a cross section through the wiper assembly taken on line 5—5 of Figure 2.

Figure 6 is a detail on an enlarged scale showing the means for mounting the telescoping arm on the outer end of the arm.

Figure 7 is a detail showing the roller carrying lever at the outer end of the telescoping rod.

Figure 8 is a cross section through the track mounted on the rim of the windshield with a roller therein and with parts broken away.

Referring now to the drawings wherein like reference characters indicate corresponding parts the windshield wiper of this invention includes an arm 10 that carries a wiper 11, an extension arm 12 secured to and extending outwardly from the outer end of the first arm, a rod 13 slidably mounted in the extension arm, a wiper 14 carried by the rod, and a track 15 positioned around the rim of a windshield.

The arm 10 is fixedly mounted on a shaft 16 extending through the lower edge 17 of the windshield frame and the wiper 11 is mounted at the end of an outer section 18 thereof as shown in Figure 3. The outer end of the section 18 is also provided with a bracket 19 having a channel shaped end 20 and the extension arm 12 is held between the sides of the channel shaped end. The extension arm 12 is formed with downwardly extending ends 21 and 22 and the ends are provided with slots through which the rod 13 travels.

The wiper 14 is attached to the rod 13 by a clamp 23 as shown in Figure 5, and the outer end of the rod is pivotally attached to a lever 24 through a pin 25. Rollers 26 and 27 are rotatably mounted on the ends of the lever by pins 28 and 29, and the rollers are positioned in a groove 30 of the track 15. The track is mounted on the rim of a windshield through a base 31 with screws 32 and with the roller groove in the under surface it is protected from the elements.

With the parts arranged in this manner the first wiper will follow around at the outer end of the arm in the usual manner, and the second wiper will be drawn by the rollers in the track, and by actuating the rod by which the wiper is carried outward and inward the wiper will follow and clean the outer surface of the windshield. Preferably and as shown wiper 11 is mounted to extend angularly to arm 10 and extension arm 12, bar 13 and the second wiper 14 are mounted to extend in parallel relation with wiper 11. Such angular mounting permits a greater length of swinging stroke of the whole wiper assembly relative to the frame of a windshield than prior extensible wiper assemblies.

A nozzle 33 may also be incorporated in the base in combination with the element 17 through which air or the like may be supplied against the surface of the windshield for defrosting. The air may be supplied through a pipe 34, as shown in Figures 1 and 2. It will also be understood that the nozzle may be located at any other point and the air for defrosting may be provided in any other manner.

It will be understood that modifications may be made in the design and arrangement of the parts without departing from the spirit of the invention.

What is claimed is:

1. In a wiper for a windshield having a pane of glass mounted in a frame, the combination which comprises a windshield wiper arm pivotally mounted on the frame of the windshield, said arm having an offset outer end, a channel-shaped clip carried by the outer end of the arm, an extension arm carried by the channel-shaped clip of the wiper arm, said extension arm having laterally projecting ends formed with slots therein, a flat bar slidably mounted in the slots in the ends of the extension arm, a wiper suspended from a point intermediate of the ends thereof on said flat bar, rollers carried by the outer end of the flat bar, a substantially enclosed channel on the frame of the windshield in which the rollers travel for guiding the outer end of the said flat bar and wiper thereon as the windshield wiper arm travels across the glass of the windshield, and another wiper mounted at a point intermediate of the ends thereof on the outer end of the said windshield wiper arm.

2. A windshield wiper mechanism comprising a swinging type wiper arm having an inner end adapted for pivotal mounting, a wiper element supported at a point substantially midway between its ends by the outer end of the wiper arm, an extension arm secured to and extending from the outer end of the wiper arm parallel to and laterally offset from said wiper element, spaced bearing elements mounted at opposite ends of said extension arm, a bar of greater length than the extension arm slidably mounted by said spaced bearing elements for movement lengthwise of the extension arm, a second wiper element supported at a point substantially midway between its ends by an intermediate part of the bar for sliding movement therewith in spaced parallel relation to the first wiper element and roller means mounted on the outer end of said bar adapted to ride in a windshield framing track.

3. A windshield wiper mechanism comprising a swinging type wiper arm having an inner end adapted for pivotal mounting, a wiper element supported at a point intermediate its ends by the outer end of the wiper arm and extending in angular relation to the wiper arm, an extension arm secured to and extending from the outer end of the wiper arm in angular relation to the wiper arm and in parallel relation to the wiper element, a bar slidably mounted by the extension arm for movement lengthwise thereof, a second wiper element supported at a point intermediate its ends by said bar for lengthwise movement therewith in spaced parallel relation to the first wiper element and roller means mounted on the outer end of said bar adapted to ride in a windshield framing track.

4. A windshield wiper mechanism comprising a swinging type wiper arm having an inner end adapted for pivotal mounting, a wiper element supported at a point intermediate its ends by the outer end of the wiper arm and extending in angular relation to the wiper arm, an extension arm secured to and extending from the outer end of the wiper arm in angular relation to the wiper arm and in parallel relation to the wiper element, spaced bearing elements mounted at the opposite ends of said extension arm and having supporting slots, a flat bar of greater length than the extension arm slidably mounted by said bearing elements for movement lengthwise of the extension arm, a second wiper element supported at a point intermediate its ends by said flat bar for sliding movement therewith in spaced parallel relation to the first wiper element and roller means mounted on the outer end of said bar adapted to ride in a windshield framing track.

WILLIAM TURNER.
DAN SHAW.

REFERENCES CITED

The following references are of record in the file of this patent:

UNITED STATES PATENTS

| Number | Name | Date |
| --- | --- | --- |
| 860,021 | Fesenfeld | July 16, 1907 |
| 1,913,248 | Scott | June 6, 1933 |
| 2,396,605 | Bramhall | Jan. 26, 1946 |